United States Patent
Fletcher et al.

(10) Patent No.: US 10,174,788 B2
(45) Date of Patent: Jan. 8, 2019

(54) BEARING ARRANGEMENTS

(71) Applicant: ROLLS-ROYCE plc, Derby (GB)

(72) Inventors: Paul Fletcher, Rugby (GB); Paul Wilson, Bristol (GB)

(73) Assignee: ROLLS-ROYCE plc, London (GB)

( * ) Notice: Subject to any disclaimer, the term of this patent is extended or adjusted under 35 U.S.C. 154(b) by 235 days.

(21) Appl. No.: 15/408,180

(22) Filed: Jan. 17, 2017

(65) Prior Publication Data
US 2017/0219009 A1     Aug. 3, 2017

(30) Foreign Application Priority Data
Feb. 3, 2016    (GB) .................................. 1601907.7

(51) Int. Cl.
*F16C 19/54*     (2006.01)
*F16C 25/06*     (2006.01)
(Continued)

(52) U.S. Cl.
CPC .......... *F16C 32/0474* (2013.01); *F16C 19/52* (2013.01); *F16C 25/08* (2013.01);
(Continued)

(58) Field of Classification Search
CPC .......... F16C 19/52; F16C 19/54; F16C 19/56; F16C 25/08; F16C 25/086; F16C 27/04;
(Continued)

(56) References Cited

U.S. PATENT DOCUMENTS 3,913,993 A    10/1975   Ernst
4,676,667 A *   6/1987   Komatsu ................ F01D 25/16
                                                                                       384/517
(Continued)

FOREIGN PATENT DOCUMENTS

DE          19946383 A1     4/2001
DE          101 26 103 A1    3/2002
(Continued)

OTHER PUBLICATIONS

Jul. 18, 2016 Search Report issued in British Patent Application No. 1601907.7.

*Primary Examiner* — Phillip A Johnson
(74) *Attorney, Agent, or Firm* — Oliff PLC

(57) ABSTRACT

A bearing arrangement comprising: a first bearing including a first inner race coupled to a rotatable component, a first outer race; and a plurality of first roller elements between the first inner race and the first outer race; a second bearing including a second inner race coupled to the rotatable component, a second outer race, and a plurality of second roller elements between the second inner race and the second outer race; a component, the first outer race being axially moveable relative to the component; and a member between the first bearing and the second bearing and arranged to provide an indirect first force on the first outer race to prevent the first roller elements from skidding when the first bearing and the second bearing receive a second force in a first direction, the second bearing being configured to transfer the second force to the component.

13 Claims, 8 Drawing Sheets

(51) Int. Cl.
*F16C 32/04* (2006.01)
*F16C 41/00* (2006.01)
*F16C 19/52* (2006.01)
*F16C 25/08* (2006.01)

(52) U.S. Cl.
CPC .......... *F16C 41/008* (2013.01); *F16C 25/086* (2013.01); *F16C 2233/00* (2013.01); *F16C 2360/23* (2013.01)

(58) Field of Classification Search
CPC .............. F16C 2229/00; F16C 2233/00; F16C 2360/23
See application file for complete search history.

(56) References Cited

U.S. PATENT DOCUMENTS

| | | | |
|---|---|---|---|
| 5,836,739 A | * | 11/1998 | Haramura ............ F01D 25/168 415/104 |
| 9,447,817 B2 | | 9/2016 | Gallimore et al. |
| 9,470,262 B2 | | 10/2016 | Gallimore et al. |
| 2005/0135718 A1 | | 6/2005 | Vezina |
| 2011/0123326 A1 | | 5/2011 | DiBenedetto et al. |
| 2011/0206310 A1 | | 8/2011 | Ventzke |
| 2015/0043858 A1 | * | 2/2015 | Aust ...................... F16C 25/08 384/558 |
| 2015/0267745 A1 | | 9/2015 | Gallimore et al. |
| 2016/0123384 A1 | | 5/2016 | Webster et al. |
| 2016/0123839 A1 | | 5/2016 | Gallimore et al. |
| 2016/0160911 A1 | | 6/2016 | Gallimore et al. |
| 2016/0160928 A1 | | 6/2016 | Gallimore |

FOREIGN PATENT DOCUMENTS

| | | | | |
|---|---|---|---|---|
| DE | 102011080796 A1 | * | 2/2013 | ............ F16C 25/086 |
| DE | 102012210419 A1 | * | 12/2013 | ............ F16C 23/086 |
| GB | 1344318 A | | 1/1974 | |
| WO | 2011/139310 A2 | | 11/2011 | |

* cited by examiner

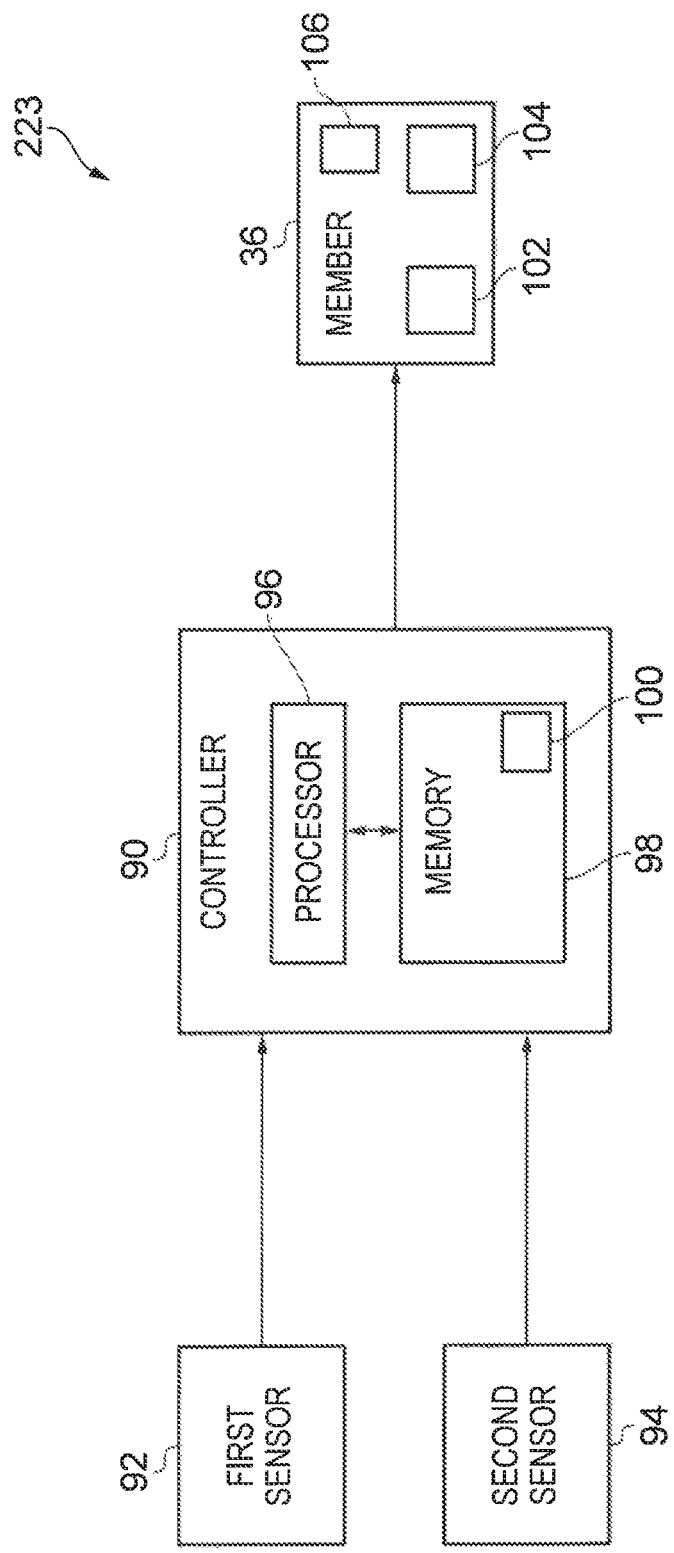

BEARING ARRANGEMENTS

TECHNOLOGICAL FIELD

The present disclosure concerns bearing arrangements.

BACKGROUND

In gas turbine engines, one or more shafts of the engine are usually subject to axial thrust loads during operation. Thrust loads arise in a gas turbine engine as a result of pressure imbalances. For example, a compressor has a higher downstream pressure than upstream pressure which forces the compressor upstream (towards the intake) whereas a turbine has a higher upstream pressure than downstream pressure which forces the turbine downstream (towards the exhaust nozzle). The thrust loads urging the compressor upstream and the turbine downstream may be high and uncertain.

The thrust loads are often at their maximum during the periods of highest power output for the engine. In a gas turbine engine providing jet propulsion for an aircraft, this period of maximized power output may occur when the aircraft is taking-off and/or climbing to a cruising altitude. The thrust loads may change direction (passing through a zero load point) during a flight cycle.

A thrust bearing may be positioned to support the shaft against these thrust loads. A thrust bearing typically comprises an inner race, an outer race, a cage, and a set of roller elements, the roller elements being spheres (or balls) which are contained within a raceway formed in one or both of the races with the cage maintaining the spacing between the balls.

BRIEF SUMMARY

According to various examples there is provided a bearing arrangement comprising: a first bearing including a first inner race coupled to a rotatable component, a first outer race; and a plurality of first roller elements between the first inner race and the first outer race; a second bearing including a second inner race coupled to the rotatable component, a second outer race, and a plurality of second roller elements between the second inner race and the second outer race; a component, the first outer race being axially moveable relative to the component; and a member between the first bearing and the second bearing and arranged to provide an indirect first force on the first outer race to prevent the first roller elements from skidding when the first bearing and the second bearing receive a second force in a first direction, the second bearing being configured to transfer the second force to the component.

The member may comprise a cavity configured to receive a fluid therein to provide the indirect first force on the first outer race.

The fluid may be a liquid and the indirect first force may be provided hydraulically.

The fluid may be a gas and the indirect first force may be provided pneumatically.

The member may comprise an electromagnet configured to generate a magnetic field to magnetically repel the first outer race and provide the indirect first force.

The first outer race may comprise a first protrusion extending radially outwards from the first outer race, and the component may comprise a second protrusion extending radially inwards from the component.

The member may be arranged to: provide an indirect third force on the second outer race to prevent the second roller elements from skidding when the first bearing and the second bearing receive a fourth force in a second direction. The first bearing may be configured to transfer the fourth force to the component.

The second outer race may comprise a third protrusion extending radially outwards from the second outer race. The component may comprise a fourth protrusion extending radially inwards from the component.

The first bearing and the second bearing may have a different mass and/or a different size.

The bearing arrangement may further comprise a controller configured to control the member to vary the indirect first force on the first outer race.

The controller may be configured to control the member to increase the indirect first force on the first outer race in response to determining that the plurality of first roller elements are skidding.

According to various examples there is provided a gas turbine engine comprising a bearing arrangement as described in any of the preceding paragraphs.

According to various examples there is provided a mechanical or electro-mechanical system comprising a bearing arrangement as described in any of the preceding paragraphs.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION

Embodiments will now be described by way of example only, with reference to the Figures, in which:

FIG. 7 illustrates a schematic diagram of a bearing arrangement according to various examples.

DETAILED DESCRIPTION

Figure 1:
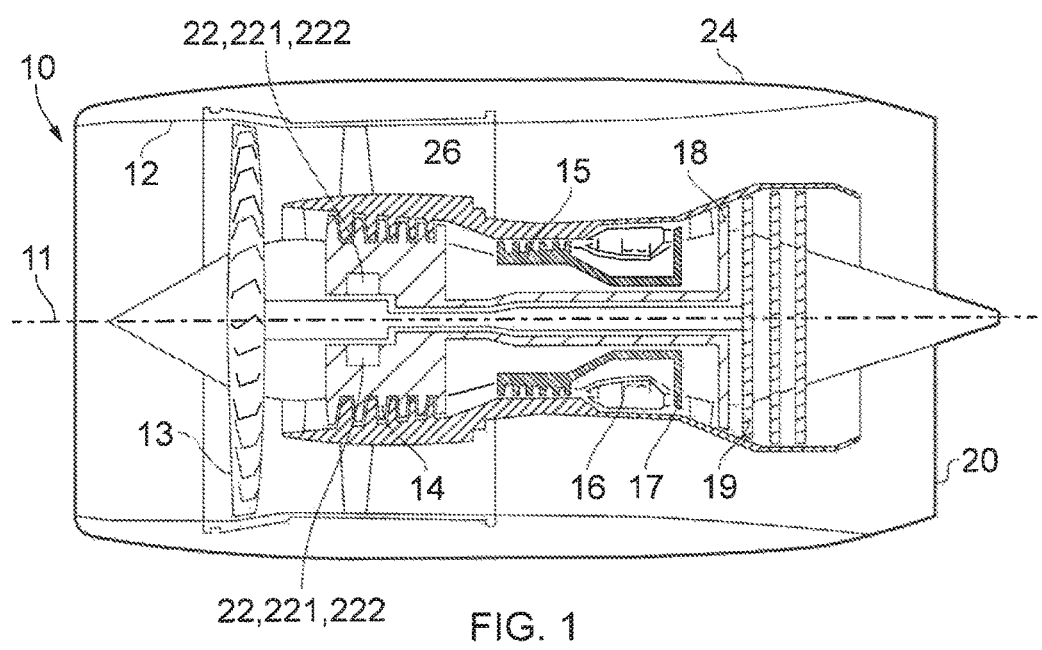
FIG. 1 illustrates a cross sectional side view of a gas turbine engine according to various examples.

In more detail, FIG. 1 illustrates a gas turbine engine 10 having a principal and rotational axis 11. The gas turbine engine 10 comprises an air intake 12, a propulsive fan 13, an intermediate pressure compressor 14, a high-pressure compressor 15, combustion equipment 16, a high-pressure turbine 17, an intermediate pressure turbine 18, a low-pressure turbine 19, an exhaust nozzle 20, and a bearing arrangement 22, 221, 222. A nacelle 24 generally surrounds the engine 10 and defines both the intake 12 and the exhaust nozzle 20.

The gas turbine engine 10 operates so that air entering the intake 12 is accelerated by the fan 13 to produce two air flows: a first air flow into the intermediate pressure compressor 14 and a second air flow which passes through a bypass duct 26 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shafts.

Other gas turbine engines to which the present disclosure may be applied may have alternative configurations. For example, such engines may have an alternative number of interconnecting shafts (e.g. two) and/or an alternative number of compressors and/or turbines. Furthermore, such engines may comprise a gearbox provided in the drive train from a turbine to a compressor and/or fan, The bearing arrangement 22, 221, 222, 223 is described in greater detail in the following paragraphs and with reference to FIGS. 2 to 7.

Figure 2:
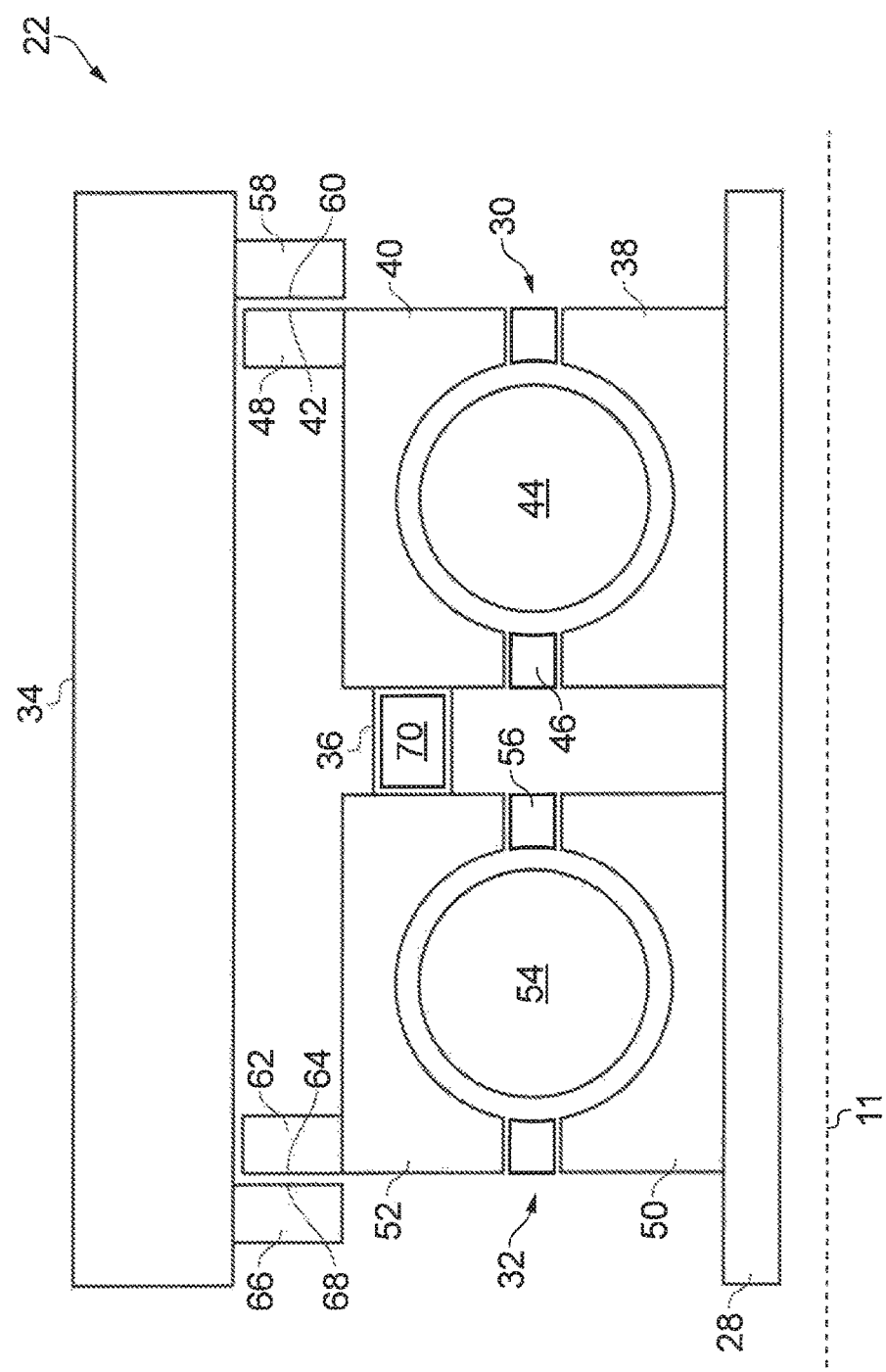
FIG. 2 illustrates a cross sectional side view of a bearing arrangement according to various examples.

FIG. 2 illustrates a cross sectional side view of a bearing arrangement 22 according to various examples. The bearing arrangement 22 includes a rotatable component 28, a first bearing 30, a second bearing 32, a component 34, and a member 36. In some examples, the bearing arrangement 22 may be a module. As used herein, the wording 'module' refers to an apparatus or arrangement where one or more features are included at a later time and, possibly, by another manufacturer or by an end user. For example, where the bearing arrangement 22 is a module, the bearing arrangement 22 may only include the first bearing 30, the second bearing 32 and the member 36. The rotatable component 28 and the component 34 may be added later and possibly by another manufacturer.

In summary, the first bearing 30 and the second bearing 32 are non-load sharing. In other words, when the bearing arrangement 22 receives a load in one direction, one of the first and second bearings 30, 32 transfers the bad to the component 34, and when the bearing arrangement 22 receives a load in the opposite direction, the other of the first and second bearings 30, 32 transfers the load to the component 34. The member 36 is configured to provide a force to the first and second bearings 30, 32 during operation to prevent skidding of the unloaded bearing.

The rotatable component 28 may be any rotatable component of the gas turbine engine 10. For example, the rotatable component 28 may be a shaft of the gas turbine engine 10 such as the shaft interconnecting the high pressure turbine 17 and the high pressure compressor 15, or the shaft interconnecting the intermediate pressure turbine 18 and the intermediate pressure compressor 14, or the shaft interconnecting the low pressure turbine 19 and the fan 13.

The first bearing 30 includes a first inner race 38 coupled to a rotatable component 28, a first outer race 40 comprising a first surface 42; a plurality of first roller elements 44 between the first inner race 38 and the first outer race 40; and a cage 46. The first outer race 40 includes one or more first protrusions 48 that extend radially outwards from the first outer race 40 and defines the first surface 42. The first surface 42 may be a single surface or may be a plurality of discontinuous surfaces.

The second bearing 32 includes a second inner race 50 coupled to the rotatable component 28, a second outer race 52, a plurality of second roller elements 54 between the second inner race 50 and the second outer race 52; and a cage 56.

The component 34 may be any rotatable or non-rotatable component of the gas turbine engine 10. For example, the component 34 may be the shaft interconnecting the intermediate pressure turbine 18 and the intermediate pressure compressor 14, the shaft interconnecting the high pressure turbine 17 and the high pressure compressor 15, or a structure for supporting stator vanes. The component 34 includes one or more second protrusions 58 that define a second surface 60 positioned adjacent to the first surface 42 of the first outer race 40. It should be appreciated that the second surface 60 may be a single surface or may be a plurality of discontinuous surfaces.

The first outer race 40 is moveable axially relative to the component 34. Consequently, the first surface 42 may move axially relative to the second surface 60 and may move between a position where the first surface 42 touches the second surface 60 and a position where the first surface 42 does not touch the second surface 60.

The second outer race 52 may include one or more third protrusions 62 that extend radially outwards from the second outer race 52 and define a third surface 64. Additionally, the component 34 may include one or more fourth protrusions 66 that define a fourth surface 68. The third surface 64 may move axially relative to the fourth surface 68 and may move between a position where the third surface 64 touches the fourth surface 68 and a position where the third surface 64 does not touch the fourth surface 68. The third and fourth surfaces 64, 68 may each be single surfaces, or may each include a plurality of discontinuous surfaces.

In other examples, the second bearing 32 may not include the third protrusion 62 and the component 34 may not include the fourth protrusion 66. Instead, the second outer race 52 may be connected to the component 34 and thereby fixed in an axial position relative to the component 34 (via mechanical fasteners for example).

The member 36 is positioned between the first bearing 30 and the second bearing 32 and is arranged to provide indirect force on the first outer race 40 and (optionally) the second outer race 52. As used herein, an "indirect" force is one in which the component that generates the force, does not directly touch the first outer race 40 and the second outer race 52. For example, the member 36 may comprise an electromagnet configured to generate a magnetic field to magnetically repel the first outer race 40 and (optionally) the second outer race 52 and thereby provide the indirect force.

Alternatively, the member 36 may comprise a cavity 70 configured to receive a fluid therein to provide the indirect force on the first outer race 40 and (optionally) the second outer race 52. In some examples, the fluid may be a liquid and the indirect force may be applied hydraulically. For example, the member 36 may comprise a piston to provide a force to the liquid in the cavity 70 which in turn applies force to the first outer race 40 and (optionally) the second outer race 52. In other examples, the fluid may be a gas and the indirect force may be applied pneumatically. For example, the member 36 may include a conduit for delivering compressed air (bled from the intermediate pressure compressor 14 for example) to the cavity 70 which in turn applies force to the first outer race 40 and (optionally) the second outer race 52. In another example, the member 36 may include a conduit for delivering "starter" air (provided by an auxiliary power unit for example) to the cavity 70 which in turn applies force to the first outer race 40 and (optionally) the second outer race 52.

Figure 3:
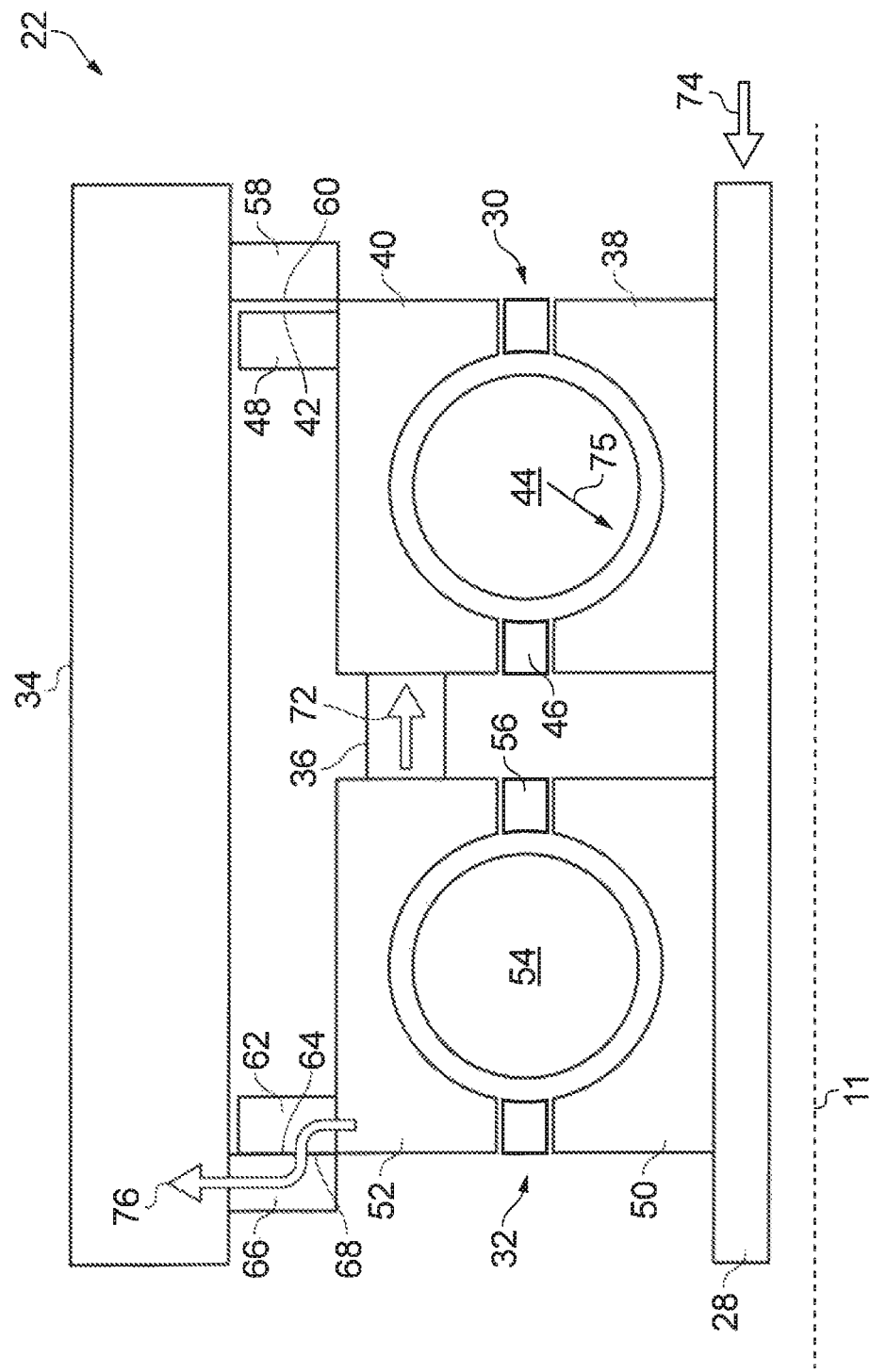
FIG. 3 illustrates a cross sectional side view of the bearing arrangement illustrated in FIG. 2 subject to a force in a first direction.

As illustrated in FIG. 3, the member 36 is configured to provide an indirect first force 72 to move the first outer race 40 to exert a force on the first roller elements 44 and thereby prevent the first roller elements 44 from skidding when the first bearing 30 and the second bearing 32 receive a second force 74 in a first direction (parallel to the axis 11 and pointed to the left in FIG. 3). In more detail, when the first bearing 30 receives the second force 74, the first inner race 38 moves axially left and the first roller elements 44 move in the direction of arrow 75. The indirect first force 72 moves the first outer race 40 towards the roller elements 44 to ensure that the first inner race 38, the first roller elements 44 and the first outer race 40 remain in loaded contact. The member 36 may also apply an equal and opposite reaction force on the second outer race 52 while the first force 72 is applied to the first outer race 40.

It should be appreciated that in some examples, the member 36 may provide the indirect first force 72 to the first outer race 40 to maintain loaded contact between the first outer race 40, the first roller elements 44 and the first inner race 38 without moving the first outer race 40 when the first bearing 30 and the second bearing 32 receive the second force 74.

The second bearing 32 is configured to transfer the second force 74 to the component 34 and this is indicated by force arrow 76 in FIG. 3. Where the second bearing 32 is connected to the component 34, the second force 74 is transferred via that connection. Where the second bearing 32 includes the third protrusion 62 and the component 34 includes the fourth protrusion 66, the second force 74 is transferred via the third and fourth protrusions 62, 66. Since the first bearing 30 and the second bearing 32 are non-load sharing, substantially all of the second force 74 is transferred to the component 34 via the second bearing 32 and substantially none of the second force 74 is transferred to the component 34 (or any other component of the gas turbine engine 10) via the first bearing 30. In other words, even when the first force 72 is applied, the second force 74 may only reach the component 34 via the second outer race 52 of the second bearing 32.

In summary, the second force 74 may only reach the component 34 as force 76, which only takes the load through the second bearing 32. Applying the first force 72 ensures that there is some load on the first bearing 30 and prevents the first bearing 30 from skidding. The first force 72 reaches the rotatable component 28 via the first outer race 40, the first roller elements 44, and the first inner race 38 and may thereby reduce the axial load on the second roller elements 54.

Figure 4:
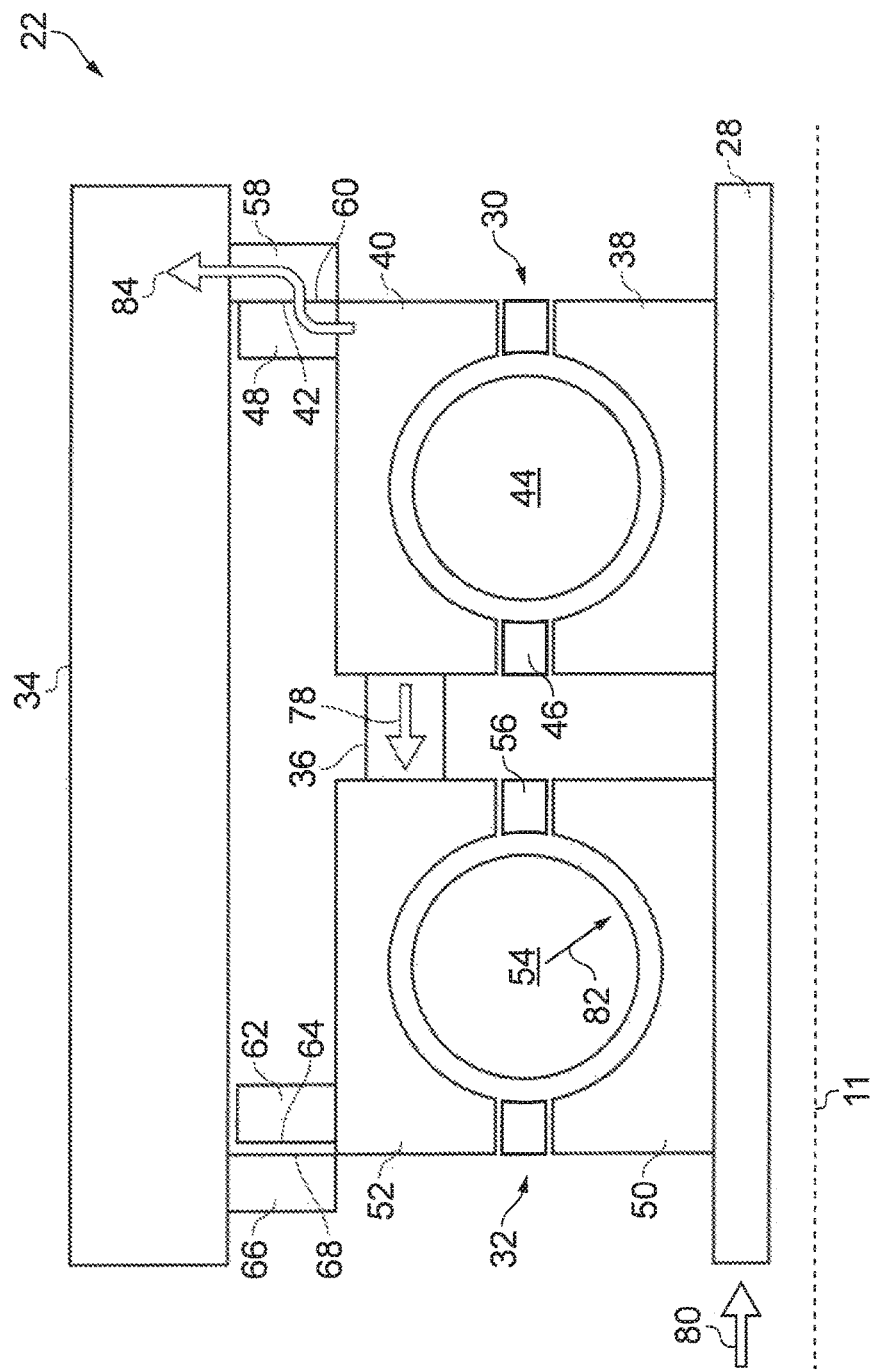
FIG. 4 illustrates a cross sectional side view of the bearing arrangement illustrated in FIG. 2 subject to a force in a second direction.

As illustrated in FIG. 4, the member 36 may be configured to provide an indirect third force 78 to move the second outer race 52 to exert a force on the second roller elements 54 and thereby prevent the second roller elements 54 from skidding when the first bearing 30 and the second bearing 32 receive a fourth force 80 in a second direction (parallel to the axis 11 and pointed to the right in FIG. 4). In more detail, when the second bearing 32 receives the fourth force 80, the second inner race 50 moves axially to the right and the second roller elements 54 move in the direction of arrow 82. The indirect third force 78 moves the second outer race 52 towards the second roller elements 54 to ensure that the second inner race 50, the second roller elements 54 and the second outer race 52 remain in loaded contact. The member 36 may also apply an equal and opposite reaction force on the first outer race 40 while the third force 78 is applied to the second outer race 52.

It should be appreciated that in some examples, the member 36 may provide the indirect third force 78 to the second outer race 52 to maintain loaded contact between the second outer race 52, the second roller elements 54 and the second inner race 50 without moving the second outer race 52 when the first bearing 30 and the second bearing 32 receive the fourth force 80.

The first bearing 30 is configured to transfer the fourth force 80 to the component 34 via the first outer race 40 and this is indicated by force arrow 84 in FIG. 4. In more detail, the fourth force 80 is transferred to the component 34 via the first protrusion 48 of the first outer race 40 and the second protrusion 58 of the component 34. As mentioned in the previous paragraphs, the first bearing 30 and the second bearing 32 are non-load sharing and consequently, substantially all of the fourth force 80 is transferred to the component 34 via the first outer race 40 of the first bearing 30 and substantially none of the fourth force 80 is transferred to the component 34 (or any other component of the gas turbine engine 10) via the second bearing 32.

In summary, the fourth force 80 may only reach the component 34 as force 84, which only takes load the through the first bearing 30. Applying the third force 78 ensures that there is some load on the second bearing 32 and prevents the second bearing 32 from skidding. The third force 78 reaches the rotatable component 28 via the second outer race 52, the second roller elements 54, and the second inner race 50 and may thereby reduce the axial load on the first roller elements 44.

Figure 5:
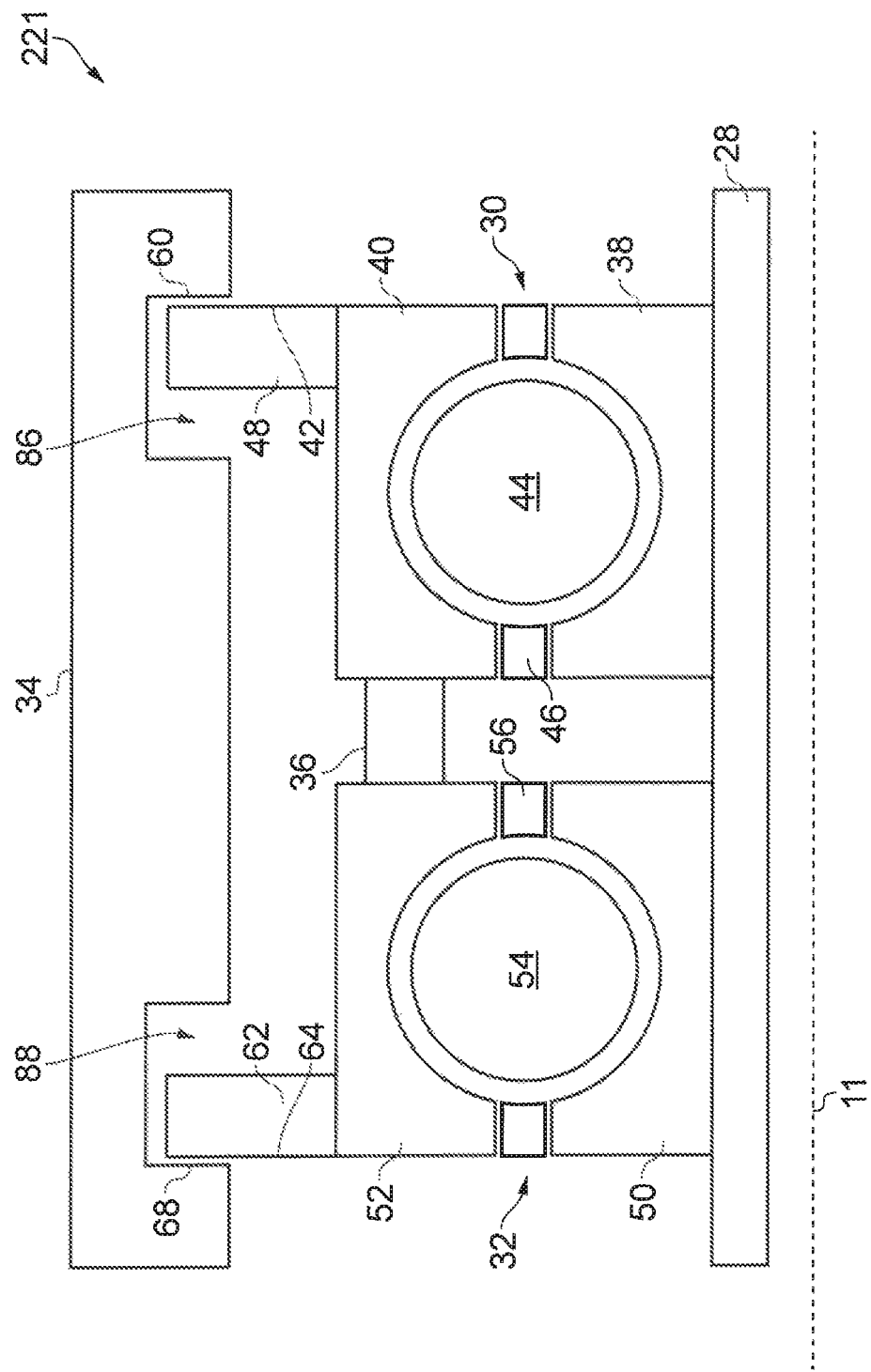
FIG. 5 illustrates a cross sectional side view of another bearing arrangement according to various examples.

FIG. 5 illustrates another bearing arrangement 221 according to various examples. The bearing arrangement 221 is similar to the bearing arrangement 22 and where the features are similar, the same reference numerals are used. The bearing arrangement 221 differs from the bearing arrangement 22 in that the bearing arrangement 221 does not include the second and fourth protrusions 58, 66 and instead, the component 34 defines a first groove 86 and a second groove 88 therein. The first groove 86 defines the second surface 60 and the first protrusion 48 is positioned within the first groove 86. The second groove 88 defines the fourth surface 68 and the third protrusion 62 is positioned within the second groove 88.

It should be appreciated that in other examples, the first and second outer races 40, 52 may define grooves therein instead of the first and third protrusions 48, 62 and that the second and fourth protrusions 58, 66 of the component 34 may be positioned within the grooves of the first and second outer races 40, 52.

Figure 6A:
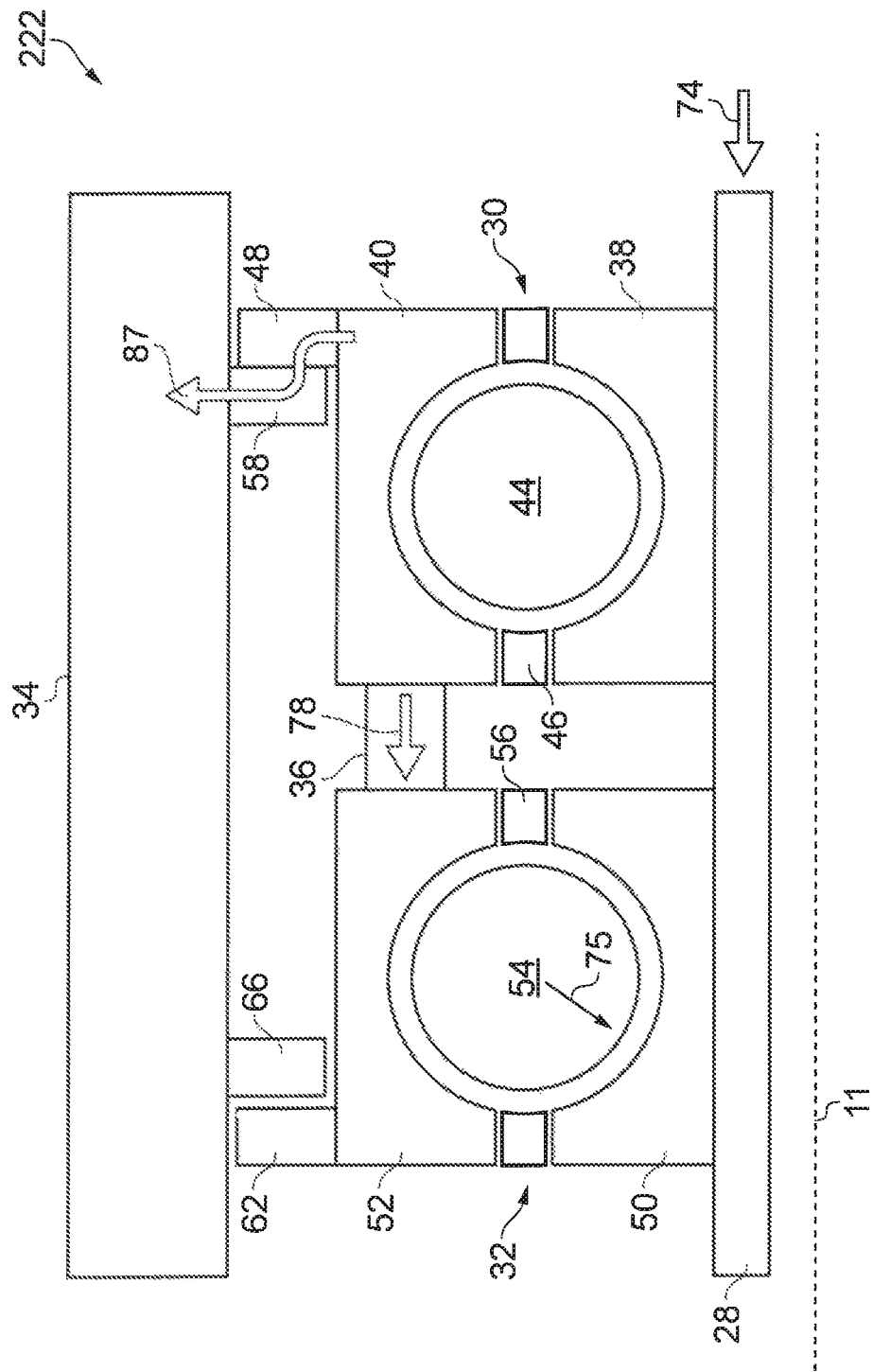
FIGS. 6A and 6B illustrate cross sectional side views of a further bearing arrangement according to various examples.
Figure 6B:
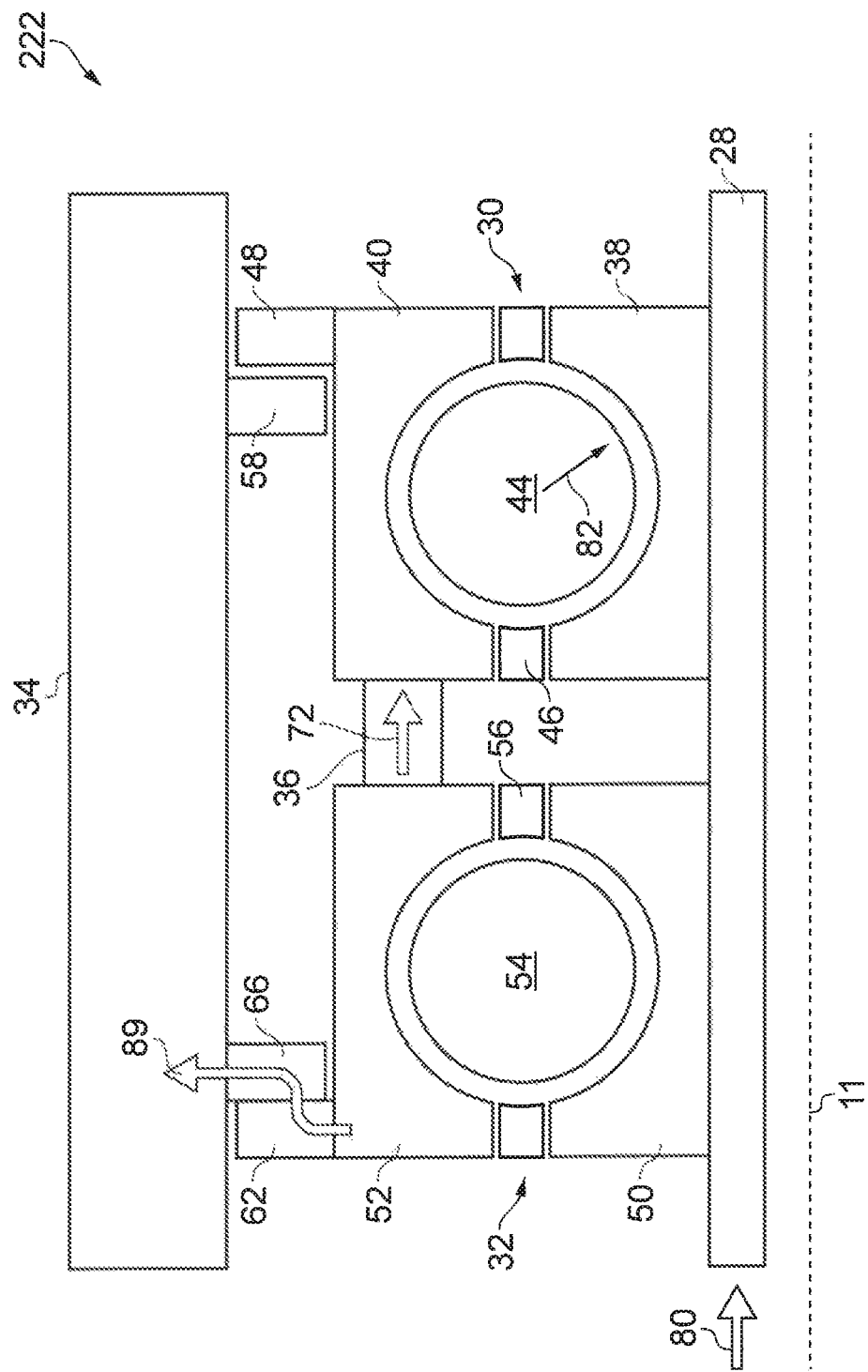

FIGS. 6A and 6B illustrate schematic cross sectional side view diagram of a further bearing arrangement 222 according to various examples. The bearing arrangement 222 is similar to the bearing arrangement 22 and where the features are similar, the same reference numerals are used. The bearing arrangement 222 differs from the bearing arrangement 22 in that the second and fourth protrusions 58, 66 are positioned axially within the first and third protrusions 48, 62.

As illustrated in FIG. 6A, the member 36 is configured to provide the indirect third force 78 to move the second outer race 52 to exert a force on the second roller elements 54 and thereby prevent the second roller elements 54 from skidding when the first bearing 30 and the second bearing 32 receive the second force 74 in the first direction (parallel to the axis 11 and pointed to the left in FIG. 6A). In more detail, when the second bearing 32 receives the second force 74, the second inner race 50 moves axially left and the second roller elements 54 move in the direction of arrow 75. The indirect third force 78 moves the second outer race 52 towards the second roller elements 54 to ensure that the second inner race 50, the second roller elements 54 and the second outer race 52 remain in loaded contact.

It should be appreciated that the member 36 may also apply an equal and opposite reaction force on the first outer race 40 while the third force 78 is applied to the second outer race 52.

The first bearing 30 is configured to transfer the second force 74 to the component 34 and this is indicated by force arrow 87 in FIG. 6A. In more detail, the second force 74 is transferred to the component 34 via the first inner race 38, the first roller elements 44, the first outer race 40, the first protrusion 48 and the second protrusion 58. Since the first bearing 30 and the second bearing 32 are non-load sharing, substantially all of the second force 74 is transferred to the component 34 via the first bearing 30 and substantially none of the second force 74 is transferred to the component 34 (or any other component of the gas turbine engine 10) via the second bearing 32. In other words, even when the third force 78 is applied, the second force 74 may only reach the component 34 via the first outer race 40 of the first bearing 30.

As illustrated in FIG. 6B, the member 36 may be configured to provide the indirect first force 72 to move the first outer race 40 to exert a force on the first roller elements 44 and thereby prevent the first roller elements 44 from skidding when the first bearing 30 and the second bearing 32 receive the fourth force 80 in the second direction (parallel to the axis 11 and pointed to the right in FIG. 6B). In more detail, when the first bearing 30 receives the fourth force 80, the first inner race 38 moves axially to the right and the first roller elements 44 move in the direction of arrow 82. The indirect first force 72 moves the first outer race 40 towards the first roller elements 44 to ensure that the first inner race 38, the first roller elements 44 and the first outer race 40 remain in loaded contact.

It should be appreciated that the member 36 may also apply an equal and opposite reaction force on the second outer race 52 while the first indirect force 72 is applied to the first outer race 40.

The second bearing 32 is configured to transfer the fourth force 80 to the component 34 via the second outer race 52 and this is indicated by force arrow 89 in FIG. 6B. In more detail, the fourth force 80 is transferred to the component 34 via the second inner race 50, the second roller elements 54, the second outer race 52, the third protrusion 62 of the second outer race 52 and the fourth protrusion 66 of the component 34. As mentioned in the previous paragraphs, the first bearing 30 and the second bearing 32 are non-load sharing and consequently, substantially all of the fourth force 80 is transferred to the component 34 via the second outer race 52 of the second bearing 30 and substantially none of the fourth force 80 is transferred to the component 34 (or any other component of the gas turbine engine 10) via the first bearing 30.

FIG. 7 illustrates a schematic diagram of a bearing arrangement 223 according to various examples. The bearing arrangement 223 includes the member 36, a controller 90, a first sensor 92 and (optionally) a second sensor 94. It should be appreciated that the bearing arrangement 223 may additionally comprise the various parts illustrated in FIGS. 2 to 6 (such as the first and second bearings 30, 32, the rotatable component 28, and the component 34) and that these parts are not illustrated in FIG. 7 to maintain the clarity of FIG. 7.

The controller 90 may comprise any suitable circuitry to cause performance of the methods described herein. The controller 90 may comprise: control circuitry; and/or processor circuitry; and/or at least one application specific integrated circuit (ASIC); and/or at least one field programmable gate array (FPGA); and/or single or multi-processor architectures; and/or sequential/parallel architectures; and/or at least one programmable logic controllers (PLCs); and/or at least one microprocessor; and/or at least one microcontroller; and/or a central processing unit (CPU); and/or a graphics processing unit (GPU), to perform the methods.

In various examples, the controller 90 may comprise at least one processor 96 and at least one memory 98. The memory 98 stores a computer program 100 comprising computer readable instructions that, when read by the processor 96, causes performance of the methods described herein. The computer program 100 may be software or firmware, or may be a combination of software and firmware.

The processor 96 may be located on the gas turbine engine 10, or may be located remote from the gas turbine engine 10, or may be distributed between the gas turbine engine 10 and a location remote from the gas turbine engine 10. The processor may include at least one microprocessor and may comprise a single core processor, may comprise multiple processor cores (such as a dual core processor or a quad core processor), or may comprise a plurality of processors (at least one of which may comprise multiple processor cores).

The memory 98 may be located on the gas turbine engine 10, or may be located remote from the gas turbine engine 10, or may be distributed between the gas turbine engine 10 and a location remote from the gas turbine engine 10. The memory 98 may be any suitable non-transitory computer readable storage medium, data storage device or devices, and may comprise a hard disk and/or solid state memory (such as flash memory). The memory 98 may be permanent non-removable memory, or may be removable memory (such as a universal serial bus (USB) flash drive or a secure digital card). The memory 98 may include: local memory employed during actual execution of the computer program; bulk storage; and cache memories which provide temporary storage of at least some computer readable or computer usable program code to reduce the number of times code may be retrieved from bulk storage during execution of the code.

The computer program 100 may be stored on a non-transitory computer readable storage medium. The computer program may be transferred from the non-transitory computer readable storage medium to the memory 98. The non-transitory computer readable storage medium may be, for example, a USB flash drive, a secure digital (SD) card, an optical disc (such as a compact disc (CD), a digital versatile disc (DVD) or a Blu-ray disc). In some examples, the computer program 100 may be transferred to the memory 98 via a wireless signal or via a wired signal.

Input/output devices may be coupled to the bearing arrangement 223 either directly or through intervening input/output controllers. Various communication adaptors may also be coupled to the controller 90 to enable the bearing arrangement 223 to become coupled to other apparatus or remote printers or storage devices through intervening private or public networks. Non-limiting examples include modems and network adaptors of such communication adaptors.

The first sensor 92 may comprise any suitable sensor or sensors and may comprise, for example, an eddy current sensor or a microwave transceiver sensor. The first sensor 92 is configured to sense one or more parameters of the first bearing 30 (cage speed or vibration for example). The controller 90 is configured to receive the sensed one or more parameters from the first sensor 92 and to determine whether, and to what extent, the plurality of first roller elements 44 are skidding between the first inner race 38 and the first outer race 40.

Similarly, the second sensor 94 may comprise any suitable sensor or sensors and may comprise, for example, an eddy current sensor or a microwave transceiver sensor. The second sensor 94 is configured to sense one or more parameters of the second bearing 32. The controller 90 is configured to receive the sensed one or more parameters from the second sensor 94 and to determine whether, and to what extent, the plurality of second roller elements 54 are skidding between the second inner race 50 and the second outer race 52.

The controller 90 is configured to control the member 36 to vary the indirect first force 72 on the first outer race 40 and (optionally) to vary the indirect third force 78 on the second outer race 52. The controller 90 may determine increased skidding of the first roller elements 44 from the sensed one or more parameters received from the first sensor 92 and may then control the member 36 to increase the indirect first force 72 on the first outer race 40 to reduce or eliminate the skidding of the first roller elements 44.

For example, when the second force 74 or the fourth force 80 fall below threshold values (that is, the load on the rotatable member 28 is within a range around zero load), the first and second roller elements 44, 54 may start to skid. The controller 90 may determine the skidding of the first and second roller elements 44, 54 from the sensed one or more parameters received from the first and second sensors 92, 94. The controller 90 may then control the member 36 to increase the indirect first force 72 and the indirect third force 78 to reduce or eliminate the skidding of the first and second roller elements 44, 54.

Where the member 36 is configured to apply the indirect force pneumatically, the controller 90 may control a valve 102 to control the pressure of the gas within the cavity 70 of the member 36. Where the member 36 is configured to apply the indirect force hydraulically, the controller 90 may control a piston 104 to control the pressure of the liquid within the cavity 70 of the member 36. Where the member 36 is configured to apply indirect force through magnetic repulsion, the controller 90 may control an electromagnet 106 to control the magnetic field strength of the electromagnet 106.

Where the member 36 is controllable by the controller 90, the first force 72 and the third force 78 may be referred to as the first controllable force 72 and the second controllable force 78 respectively.

The bearing arrangements 22, 221, 222, 223 may provide several advantages. First, the member 36 may reduce or eliminate skidding of the first and second roller elements 44, 54 within the first and second bearings 30, 32 respectively, and this may reduce wear on the bearing arrangements 22, 221, 222, 223. This may advantageously increase the time period between services of the bearing arrangements 22, 221, 222, 223 and thus reduce the cost associated with the bearing arrangements 22, 221, 222, 223.

Second, the ability to vary the force provided by the member 36 may advantageously reduce or eliminate localised wear on the first and second bearings 30, 32 and prevent skidding at various different operating conditions.

Third, since the first and second bearings 30, 32 are non-load sharing, the first and second bearings may be of different mass and/or size where the expected load envelope is not symmetrical about zero load. The unequal mass and/or size of the first and second bearings 30, 32 may advantageously reduce the cost and weight of the bearing arrangements 22, 221, 222, 223.

Fourth, since the first outer race 40 and (optionally) the second outer race 52 are slideable relative to the component 34, the member 36 may provide relatively small forces to move the first outer race 40 and the second outer race 52 relative to the component 34. This may advantageously reduce the energy consumed by the member 36 during operation.

It will be understood that the invention is not limited to the embodiments above-described and various modifications and improvements can be made without departing from the concepts described herein.

For example, the second outer race 52 may be coupled to the component 34 via a compliant mounting (such as a flexible diaphragm) instead of being slideably mounted, or fixed in position relative to the component 34

By way of another example, the bearing arrangement 22, 221, 222, 223 may be used in a different mechanical system to a gas turbine engine and examples include rocket motor turbopumps and aircraft landing gear.

In further examples, the first inner race 38 and the second inner race 50 may be a common inner race (for example, the first inner race 38 and the second inner 50 may be a single integral structure shared between the first and second bearings 30, 32).

Except where mutually exclusive, any of the features may be employed separately or in combination with any other features and the disclosure extends to and includes all combinations and sub-combinations of one or more features described herein.

The invention claimed is:

1. A bearing arrangement comprising:
   a first bearing including a first inner race coupled to a rotatable component, a first outer race; and a plurality of first roller elements between the first inner race and the first outer race;
   a second bearing including a second inner race coupled to the rotatable component, a second outer race, and a plurality of second roller elements between the second inner race and the second outer race;
   a component, the first outer race being axially moveable relative to the component; and
   a member between the first bearing and the second bearing and arranged to provide an indirect first force on the first outer race to prevent the first roller elements from skidding when the first bearing and the second bearing receive a second force in a first direction, the second bearing being configured to transfer the second force to the component.

2. A bearing arrangement as claimed in claim 1, wherein the member comprises a cavity configured to receive a fluid therein to provide the indirect first force on the first outer race.

3. A bearing arrangement as claimed in claim 2, wherein the fluid is a liquid and the indirect first force is provided hydraulically.

4. A bearing arrangement as claimed in claim 2, wherein the fluid is a gas and the indirect first force is provided pneumatically.

5. A bearing arrangement as claimed in claim 1, wherein the member comprises an electromagnet configured to generate a magnetic field to magnetically repel the first outer race and provide the indirect first force.

6. A bearing arrangement as claimed in claim 1, wherein the first outer race comprises a first protrusion extending radially outwards from the first outer race, and the component comprises a second protrusion extending radially inwards from the component.

7. A bearing arrangement as claimed in claim 1, wherein the member is arranged to: provide an indirect third force on the second outer race to prevent the second roller elements from skidding when the first bearing and the second bearing receive a fourth force in a second direction, the first bearing being configured to transfer the fourth force to the component.

8. A bearing arrangement as claimed in claim 7, wherein the second outer race comprises a third protrusion extending radially outwards from the second outer race, and the component comprises a fourth protrusion extending radially inwards from the component.

9. A bearing arrangement as claimed in claim 1, wherein the first bearing and the second bearing have a different mass and/or a different size.

10. A bearing arrangement as claimed in claim 1, further comprising a controller configured to control the member to vary the indirect first force on the first outer race.

11. A bearing arrangement as claimed in claim 1, wherein the controller is configured to control the member to increase the indirect first force on the first outer race in response to determining that the plurality of first roller elements are skidding.

12. A gas turbine engine comprising a bearing arrangement as claimed in claim 1.

13. A mechanical or electro-mechanical system comprising a bearing arrangement as claimed in claim 1.

* * * * *